United States Patent
Mido (10) Patent No.: US 12,353,813 B2
(45) Date of Patent: Jul. 8, 2025

(54) ACCOUNTING FOR STEADY STATE NOISE IN BIT RESPONSE SUPERPOSITION BASED EYE DIAGRAM SIMULATION

(71) Applicant: Synopsys, Inc., Mountain View, CA (US)

(72) Inventor: Tetsuhisa Mido, Tokyo (JP)

(73) Assignee: Synopsys, Inc., Sunnyvale, CA (US)

( * ) Notice: Subject to any disclaimer, the term of this patent is extended or adjusted under 35 U.S.C. 154(b) by 578 days.

(21) Appl. No.: 17/883,357

(22) Filed: Aug. 8, 2022

(65) Prior Publication Data

US 2023/0066423 A1    Mar. 2, 2023

Related U.S. Application Data (60) Provisional application No. 63/239,909, filed on Sep. 1, 2021.

(51) Int. Cl.
| | |
|---|---|
| *G06F 30/367* | (2020.01) |
| *G06F 30/20* | (2020.01) |
| *G06F 30/3308* | (2020.01) |
| *G06F 30/398* | (2020.01) |

(52) U.S. Cl.
CPC ............ *G06F 30/367* (2020.01); *G06F 30/20* (2020.01); *G06F 30/3308* (2020.01); *G06F 30/398* (2020.01)

(58) Field of Classification Search
CPC .. G06F 30/367; G06F 30/398; G06F 30/3308; G06F 30/20
USPC .............................. 716/115, 136, 106; 703/15
See application file for complete search history.

(56) References Cited

U.S. PATENT DOCUMENTS

| | | | |
|---|---|---|---|
| 5,321,365 A * | 6/1994 | Diamond | G01R 31/11 702/191 |
| 9,507,894 B1 * | 11/2016 | Lai | G06F 30/367 |
| 10,326,625 B1 * | 6/2019 | Nedovic | H04L 25/0276 |
| 11,016,920 B2 * | 5/2021 | Bandi | G06F 15/76 |
| 2003/0025491 A1 * | 2/2003 | Baumert | H04L 1/20 324/121 E |
| 2006/0215794 A1 * | 9/2006 | Murugan | H04L 25/03012 375/346 |
| 2011/0260749 A1 * | 10/2011 | Deas | H04L 9/003 326/8 |

(Continued)

FOREIGN PATENT DOCUMENTS

| | | | | |
|---|---|---|---|---|
| CN | 109388811 A | * | 2/2019 | G01R 23/16 |
| CN | 109907760 A | * | 6/2019 | |

(Continued)

OTHER PUBLICATIONS

Chu et al., Chinese Patent Document No. CN-107330221-A, published Nov. 7, 2017, 4 pages including abstract, claims and 1 drawing. (Year: 2017).*

(Continued)

*Primary Examiner* — Phallaka Kik
(74) *Attorney, Agent, or Firm* — Patterson + Sheridan, LLP (57) ABSTRACT

A method for circuit analysis includes removing noise from an edge response of a circuit to produce a modified edge response and performing superposition of the modified edge response to generate a waveform. The method also includes adding the removed noise to the waveform to generate a noised waveform and generating, based on the noised waveform, an eye diagram for the circuit.

20 Claims, 10 Drawing Sheets

(56) References Cited

U.S. PATENT DOCUMENTS

| | | | | |
|---|---|---|---|---|
| 2011/0285421 | A1* | 11/2011 | Deas | G06F 21/755 |
| | | | | 326/8 |
| 2016/0335382 | A1* | 11/2016 | Kawata | G06F 30/367 |
| 2018/0189213 | A1* | 7/2018 | Bandi | G06F 15/76 |
| 2019/0385057 | A1* | 12/2019 | Litichever | H04L 63/14 |

FOREIGN PATENT DOCUMENTS

| | | | | | |
|---|---|---|---|---|---|
| EP | 1282256 | A1 * | 2/2003 | | H04L 1/20 |
| JP | 2016014623 | A * | 1/2016 | | G06F 30/20 |
| JP | 6365025 | B2 * | 8/2018 | | |
| JP | 6485203 | B2 * | 3/2019 | | G06F 17/5036 |

OTHER PUBLICATIONS

Chen et al., Chinese Patent Document No. CN-110688814-A, published Jan. 14, 2020, 3 pages including abstract, claims and 1 drawing. (Year: 2020).*

* cited by examiner

ACCOUNTING FOR STEADY STATE NOISE IN BIT RESPONSE SUPERPOSITION BASED EYE DIAGRAM SIMULATION

RELATED APPLICATION

This application claims priority to and the benefit of U.S. Provisional Patent Application Ser. No. 63/239,909, entitled "CAPTURING STEADY STATE NOISE IN BIT RESPONSE SUPERPOSITION BASED EYE DIAGRAM SIMULATION," filed Sep. 1, 2021, which is incorporated herein by reference in its entirety.

TECHNICAL FIELD

The present disclosure generally relates to an electronic design automation system. In particular, the present disclosure relates to a system and method for eye diagram simulation.

BACKGROUND

A high speed, chip-to-chip system level design typically undergoes extensive simulations prior to chip manufacture for verification and optimization. One aspect of the system that may be tested using simulations is a communication channel between a transmitter and a receiver in the system. The communication channel receives a number of bits in a data stream that may have been altered (e.g., due to noise, interference, and distortion), which may be referred to as a number of bit errors. A bit error rate may be determined by dividing the quantity of bits received in error by the total number of bits transmitted within the same time period. The simulation may help determine or approximate the bit error rate of the communication channel.

SUMMARY

According to an embodiment, a method for circuit analysis includes removing noise from an edge response of a circuit to produce a modified edge response and performing superposition of the modified edge response to generate a waveform. The method also includes adding the removed noise to the waveform to generate a noised waveform and generating, based on the noised waveform, an eye diagram for the circuit.

The noise may include steady-state noise.

The noise may be independent of data input for the circuit.

The noise may be determined with a logic low representation of signals of the circuit.

The noise may be determined based on a first noise waveform determined using a logic low representation of signals of the circuit and a second noise waveform determined using a logic high representation of the signals of the circuit. The noise may be determined based on a weighted average of the first noise waveform and the second noise waveform.

The noise may include noise induced by a power supply for the circuit.

The noise may include noise induced by crosstalk between communication channels in the circuit.

The method may include verifying an operation of the circuit based on the eye diagram.

According to another embodiment, a system for circuit analysis includes a memory and a processor communicatively coupled to the memory. The processor removes noise from an edge response of a circuit to produce a modified edge response and performs superposition of the modified edge response to generate a waveform. The processor also adds the removed noise to the waveform to generate a noised waveform and generates, based on the noised waveform, an eye diagram for the circuit.

The noise may include steady-state noise.

The noise may be independent of data input for the circuit.

The noise may be determined with a logic low representation of signals of the circuit.

The noise may be determined based on a first noise waveform determined using a logic low representation of signals of the circuit and a second noise waveform determined using a logic high representation of the signals of the circuit. The noise may be determined based on a weighted average of the first noise waveform and the second noise waveform.

The noise may include noise induced by a power supply for the circuit.

The noise may include noise induced by crosstalk between communication channels in the circuit.

The processor may verify an operation of the circuit based on the eye diagram.

According to another embodiment, a non-transitory computer readable medium stores instructions that, when executed by a processor, cause the processor to characterize a steady-state noise in a circuit induced by a power supply for the circuit and remove the steady-state noise from an edge response of the circuit to produce a modified edge response. The processor also generates a waveform by performing superposition of the modified edge response and adds the steady-state noise to the waveform to generate a noised waveform. The processor further generates, based on the noised waveform, an eye diagram for the circuit and verifies an operation of the circuit based on the eye diagram.

Adding the steady-state noise to the waveform may include convoluting the steady-state noise with the waveform.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

A communication channel in a high speed, chip-to-chip system level design may be tested during simulation to determine or approximate the bit error rate of the communication channel. One way to test the communication channel is to perform transient analysis. As bit error rate specifications and requirements become extremely low (e.g., $10^{-16}$ for high speed channel design), the length of the input bit stream to be tested becomes very long. As a result, performing transient analysis during simulations is becoming more and more time consuming.

Some simulation techniques use superposition of channel edge responses, instead of transient analysis, to obtain a system eye diagram in the form of a probability density function. The edge responses may be short time domain waveforms that represent the response of the target channel to the primitive input patterns, which may include single bit pulse, rise step, and fall step. This superposition technique allows for simulation of an eye diagram of a circuit representation in less time as compared to using a transient simulation technique. The superposition technique, however, may overestimate the bit error rate of the communication channel when there is steady state noise (e.g., noise introduced by a non-ideal power supply) affecting the channel edge response. Specifically, the superposition technique may count the impact of such noise multiple times during the analysis, which results in an overly pessimistic eye diagram.

Certain aspects of the present disclosure are directed to techniques to properly account for the effects of steady state noise (e.g., noise introduced by a non-ideal power supply) in high performance superposition-based eye diagram analysis. Generally, the techniques characterize the steady state noise and remove the steady state noise from the channel edge response before superposition is performed. After superposition is performed, the characterized stead state noise is added back to the result of the superposition (e.g., through a convolution operation).

In certain embodiments, the superposition technique described in the present disclosure presents several technical advantages. For example, as a result of removing the steady state noise from the channel edge response before superposition, the effects of the steady state noise is not counted or overcounted during superposition. Additionally, adding the characterized steady state noise to the result of the superposition results in the effects of the noise being counted once. Thus, the resulting eye diagram is not overly pessimistic and more accurately captures the bit error rate of the channel. This technique allows high speed channel designers to evaluate both signal and power integrity in a single analysis. Moreover, the technique is faster than using transient analysis to generate the eye diagram, but provides similar accuracy as transient analysis.

Figure 1A:
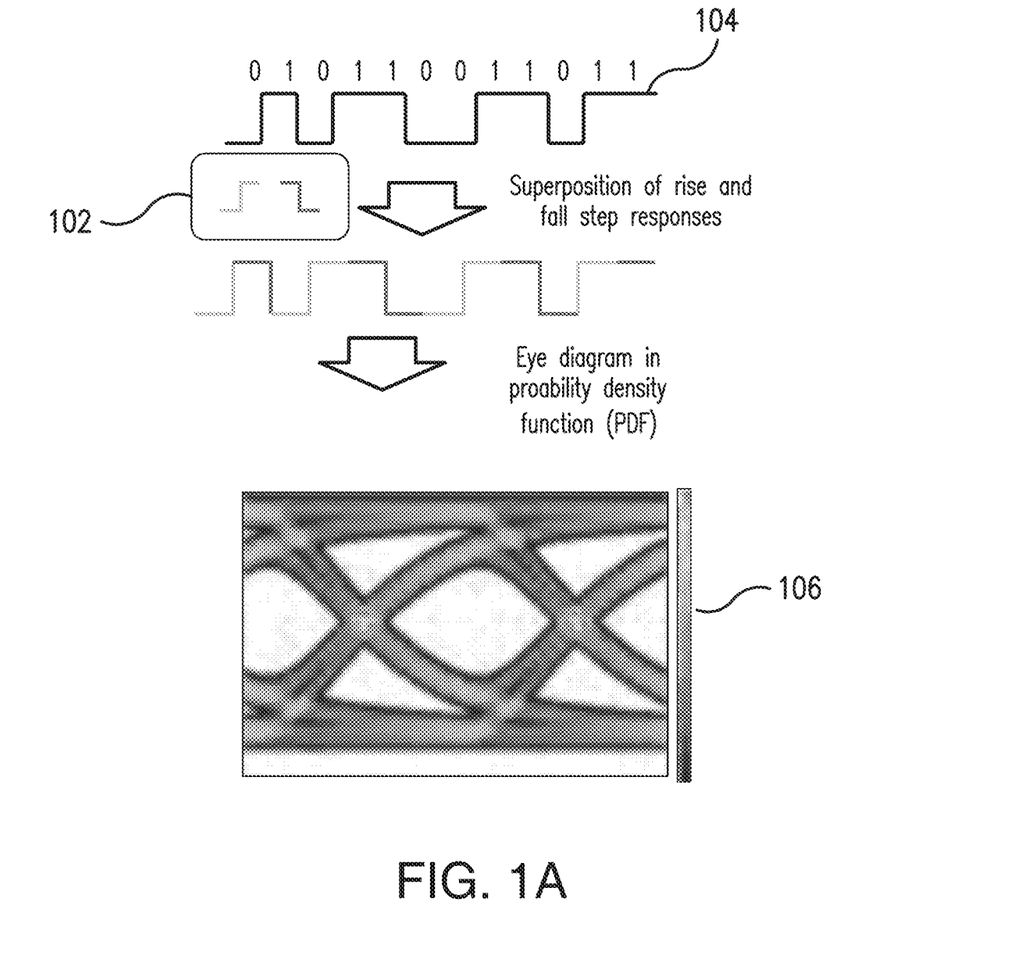
FIG. 1A and FIG. 1B show edge response superposition techniques.

FIG. 1A shows the concept of an edge response superposition technique using rise and fall step responses 102. In this technique, pre-characterized rise and fall step responses 102 are repeatedly added based on given input bit symbols 104 to compute the overall bit sequence response of the channel in the time domain. The superposition of the rise and fall step responses 102 is then used to generate the eye diagram 106. Because this technique involves using short transient analyses for the pre-characterization, it can drastically reduce computational cost and enable capturing a system eye diagram 106 with millions of input bits within a minute. Therefore, eye diagram generation based on the edge response superposition technique is used for high speed channel designs for signal integrity. FIG. 1A illustrates one example superposition technique to facilitate understanding. The aspects described in the present disclosure are applicable to any suitable superposition technique.

Figure 1B:
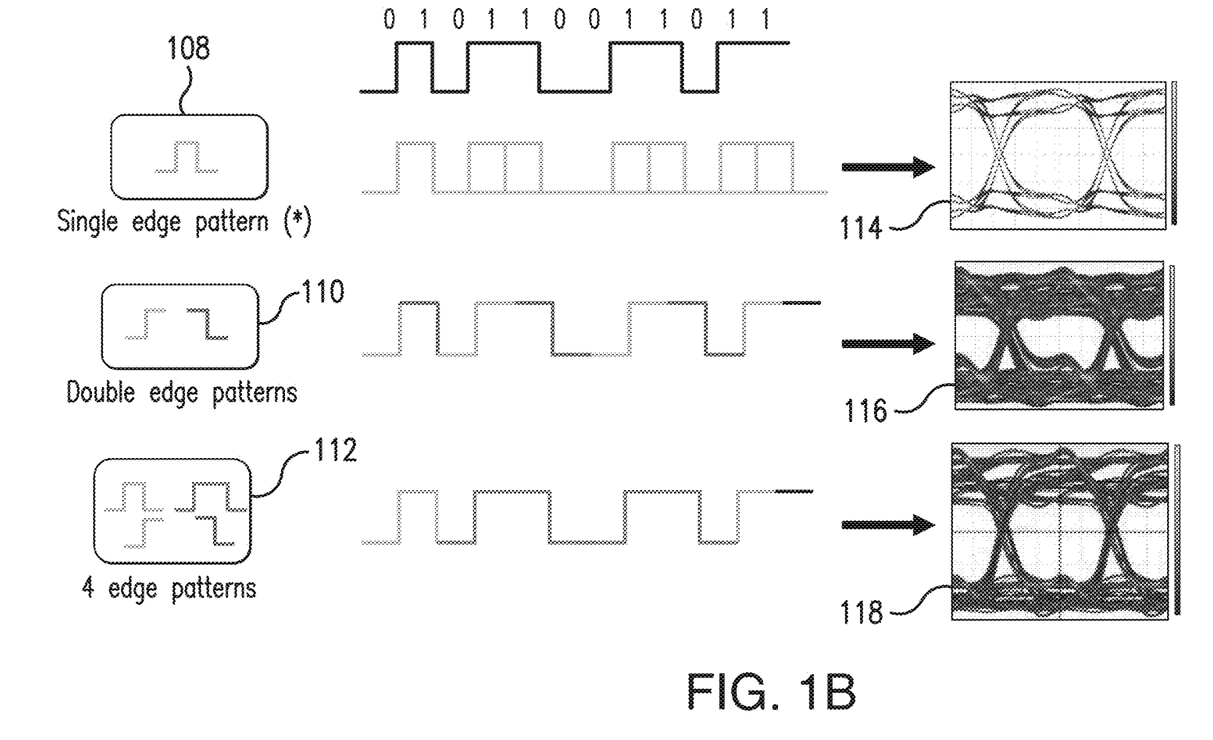

For example, as shown in FIG. 1B, there may be multiple different combinations of unit edge patterns for superposition that may be used during the analysis. The technique utilizes channel responses of multiple different sets of edge patterns to generate eye diagrams in the form of probability density functions, to evaluate bit error rates, and to perform various measurements. In the example of FIG. 1B, superposition may be implemented using a single edge pattern 108, double edge patterns 110, or four edge patterns 112. The number of edge patterns used during superposition may not be limited to those shown in FIG. 1B. Any suitable number of edge patterns may be used during superposition. Superposition may be performed using each of these different sets of edge patterns to produce different eye diagrams. The eye diagram 114 is produced from superposition using the single edge pattern 108. The eye diagram 116 is produced from superposition using the double edge patterns 110. The eye diagram 118 is produced from superposition using the four edge patterns 112.

As the importance of power integrity increases, capturing non-ideal power supply effects is important in signal integrity analyses. However, the superposition technique may break down when the target system contains noise caused by an imperfect or non-ideal power supply, which may be noise that is independent of an input pattern to the channel. This noise causes jitter on data transfer through the channel, which may also be referred to as power supply induced jitter (PSIJ).

Figure 2:
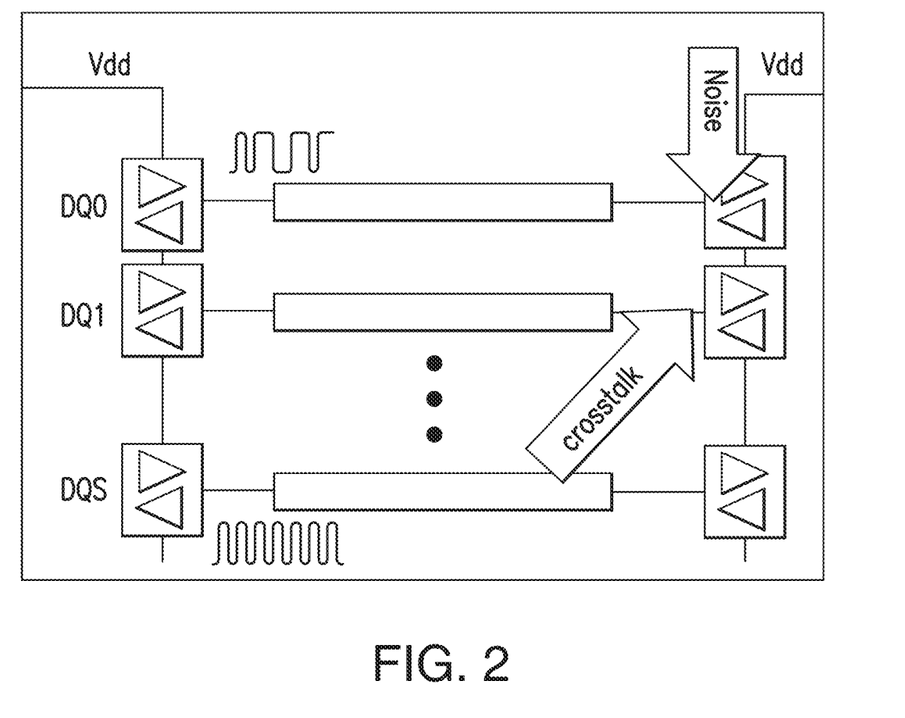
FIG. 2 illustrates power supply induced jitter (PSIJ) on a channel.

FIG. 2 illustrates PSIJ on a channel. As shown, a power supply provides a power rail Vdd to power various transmitters or buffers DQ0, DQ1, and DQS. Each of these transmitters or buffers DQ0, DQ1, and DQS communicates a signal over their respective channels. The power supply may be imperfect or non-ideal and inject noise into the signals communicated over the channels. For example, the output voltage of the power supply may not be constant. Rather, the output voltage of the power supply may continuously change within a small percentage of the desired output voltage, which introduces noise (e.g., ripples) into the outputs of the transmitters or buffers DQ0, DQ1, and DQS. There may be multiple causes for this nose, such as the clock effect on the power supply system, simultaneous switching noise (SSN), etc. Many of these causes are aligned with the system clock period. Because these noise effects appear independent of the input data pattern to a channel, this noise is also referred to as steady-state noise. Additionally, when multiple of the transmitters or buffers DQ0, DQ1, and DQS pull or draw power from the power supply at the same time, the power output of the power supply can become more inconsistent, which may introduce even more noise into the outputs of the transmitters or buffers DQ0, DQ1, and DQS. This additional noise is referred to as crosstalk in the example of FIG. 2.

When steady state noise affects the signal in the channel, the edge superposition process may overcount the effects of the noise, because the same noise appears on the top of all the edge response waveforms. The superposition process generates an eye diagram by summing multiple edge response waveforms, each having the noise associated with PSIJ. As a result, the noise is added multiple times and overcounted.

Figure 3:
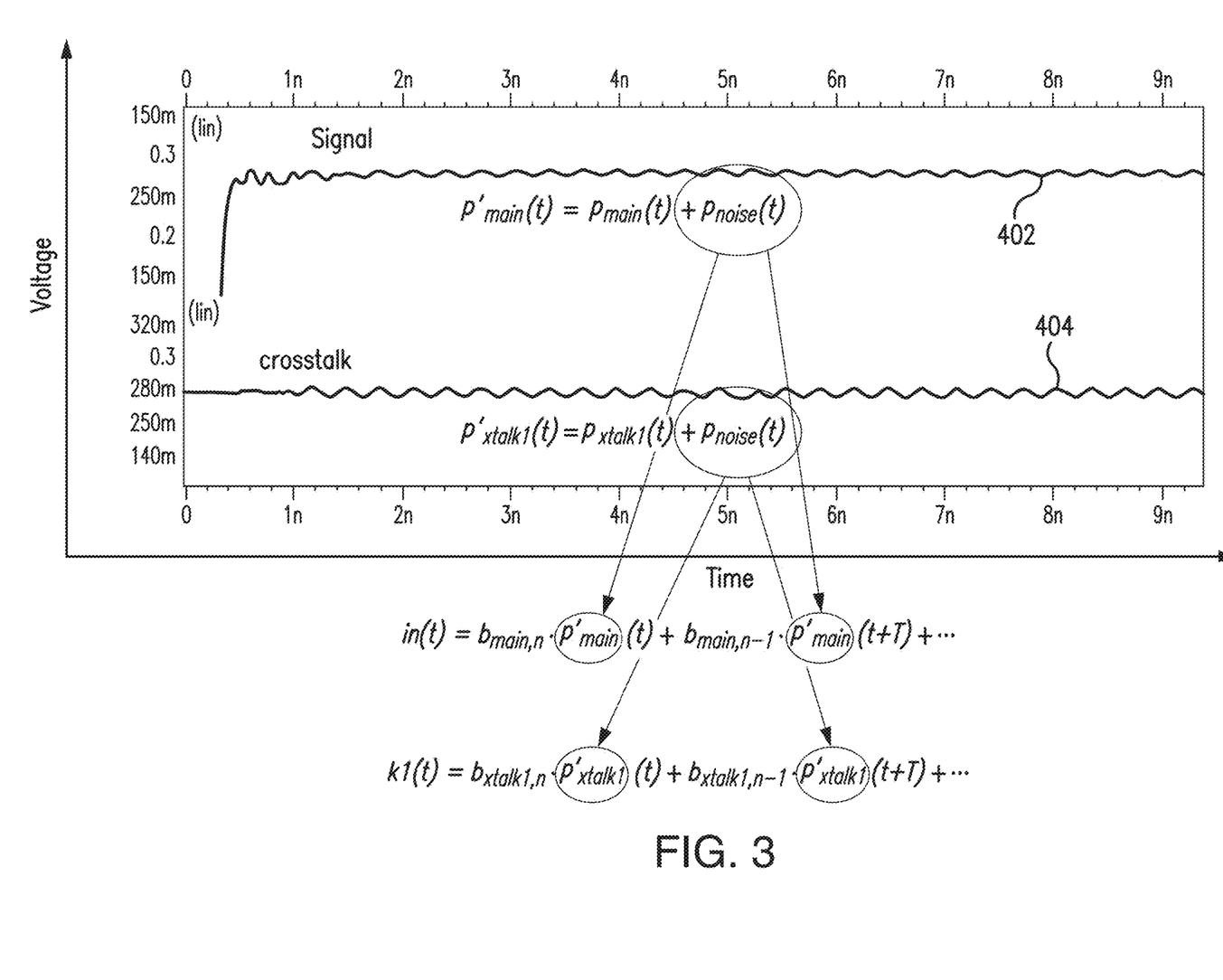
FIG. 3 illustrates accumulation of noise when performing edge response superposition.

FIG. 3 illustrates an example of the noise being overcounted when performing edge response superposition. As seen in FIG. 3, the signal 402 in a channel ($p'_{main}(t)$) may be the sum of a signal in a buffer ($p_{main}(t)$) and the noise injected by a non-ideal power supply ($p_{noise}(t)$). Additionally, the crosstalk signal 404 in the channel ($p'_{xtalk1}(t)$) may be the sum of a crosstalk signal ($p_{xtalk1}(t)$) and the noise injected by the non-ideal power supply ($p_{noise}(t)$). As a result, each of the edge response waveforms used during superposition will include the noise component from the non-ideal power supply. When these edge response waveforms are summed during superposition, the noise component will be counted multiple times, once for each edge response waveform. For example, when the edge response waveforms for the signal 402 are summed, the resulting waveform (in(t)) is the sum of multiple edge response waveforms ($b_{main,n}p'_{main}(t)+b'_{main}p'_{main}(t+T)+ \ldots$). As discussed above, each $p'_{main}$ component includes the noise injected by the non-ideal power supply ($p_{noise}(t)$). As a result, each term of the summation series will add the noise component, which results in the noise component being overcounted.

Additionally, as seen in FIG. 3, when the edge response waveforms for the crosstalk signal 404 are summed, the noise component is again overcounted. Specifically, the resulting waveform (k1(t)) is the sum of multiple edge response waveforms ($b_{xtalk1,n}p'_{xtalk1}(t)+b_{xtalk1,n-1}p'_{xtalk1}(t+T)+ \ldots$). Because each $p'_{xtalk1}$ component includes the noise injected by the non-ideal power supply ($p_{noise}(t)$), each term of the summation series will add the noise component, which results in overcounting.

Figure 4:
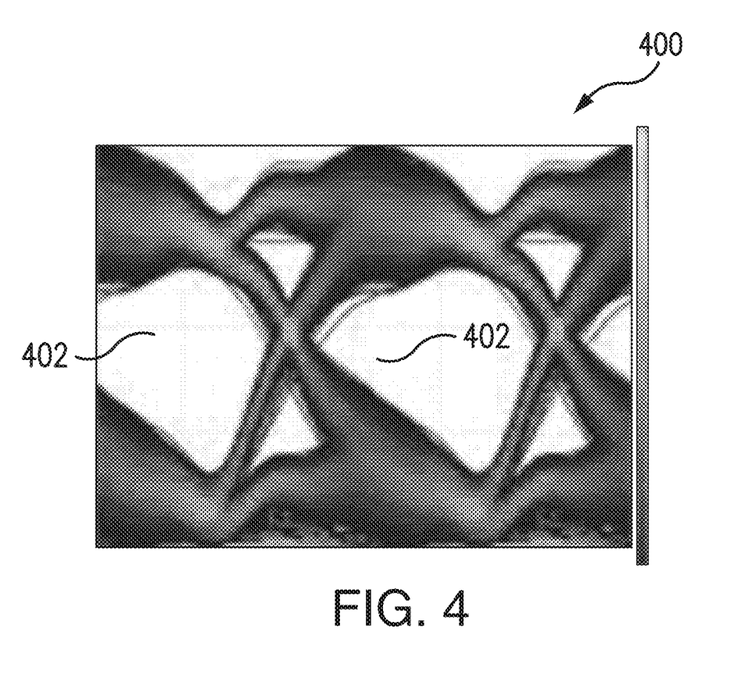
FIG. 4 shows a simulated eye diagram including accumulated noise.

As a result of the overcounting, the eye diagram generated from the superposition(s) may become overly pessimistic. FIG. 4 illustrates an example eye diagram 400 that includes accumulated noise. As seen in FIG. 4, the eye diagram 400 may include a high amount of noise (e.g., may be overly pessimistic due to noise overcount). As a result of the noise overcounting, the size of the eye openings 402 in the eye diagram 400 may be small. The eye openings 402 may be larger if the noise were properly counted.

To prevent overcounting, the techniques described herein may identify and remove the steady state noise from a signal before superposition is performed. After the edge response waveforms for the signal are summed, the steady state noise may be added back once to the resulting waveform. As a result, the contribution of the steady state noise is counted only once in the analysis.

In some aspects, a keyword (e.g., steady_state) may be used to activate a process in the circuit simulator analysis to accurately account for the steady-state noise. With this keyword, a steady-state noise pre-characterization is performed by running a short transient analysis. All the incident ports will be set with either logical low or high without any voltage level transition for the steady-state noise characterization.

In some aspects, when the noise behavior is expected to be input voltage level independent, a user may choose steady_state=1. In this case, the analysis assumes the noise shape is independent of the data signals. Therefore, the noise may be evaluated with all the signals at a logical low level only.

When the noise behavior is expected to depend on the input signal level, the user can choose steady_state=2. Then the noise will be evaluated at both logical low and high levels. Thus, the steady-state noise's dependency on the data signals' voltage level due to nonlinearity may be captured. The noise effect may then be separated from edge responses.

When steady-state noise is characterized at a logical low state only (e.g., for steady_state=1), the extracted noise component will be subtracted from the edge response. When the noise is characterized at both low and high states (e.g., for steady_state=2), the noise amount to be subtracted is estimated by a weighted average of two noise characteristics using the distance between the voltage level of the edge response waveform and two logic states at each time point as:

$$\text{Noise}(t)=w_L(t)N_L(t)+w_H(t)N_H(t)$$

where, $N_L(t)$ and $N_H(t)$ are the noise waveforms at low and high levels, respectively, and $w_L(t)$ and $w_H(t)$ are the weighting functions that indicate how close the edge response voltage is to the high and low logical states. The weighting function satisfies the following equation:

$$w_L(t)+w_H(t)=1$$

After the noise removal, noiseless edge responses may be used for superposition.

Figure 5A:
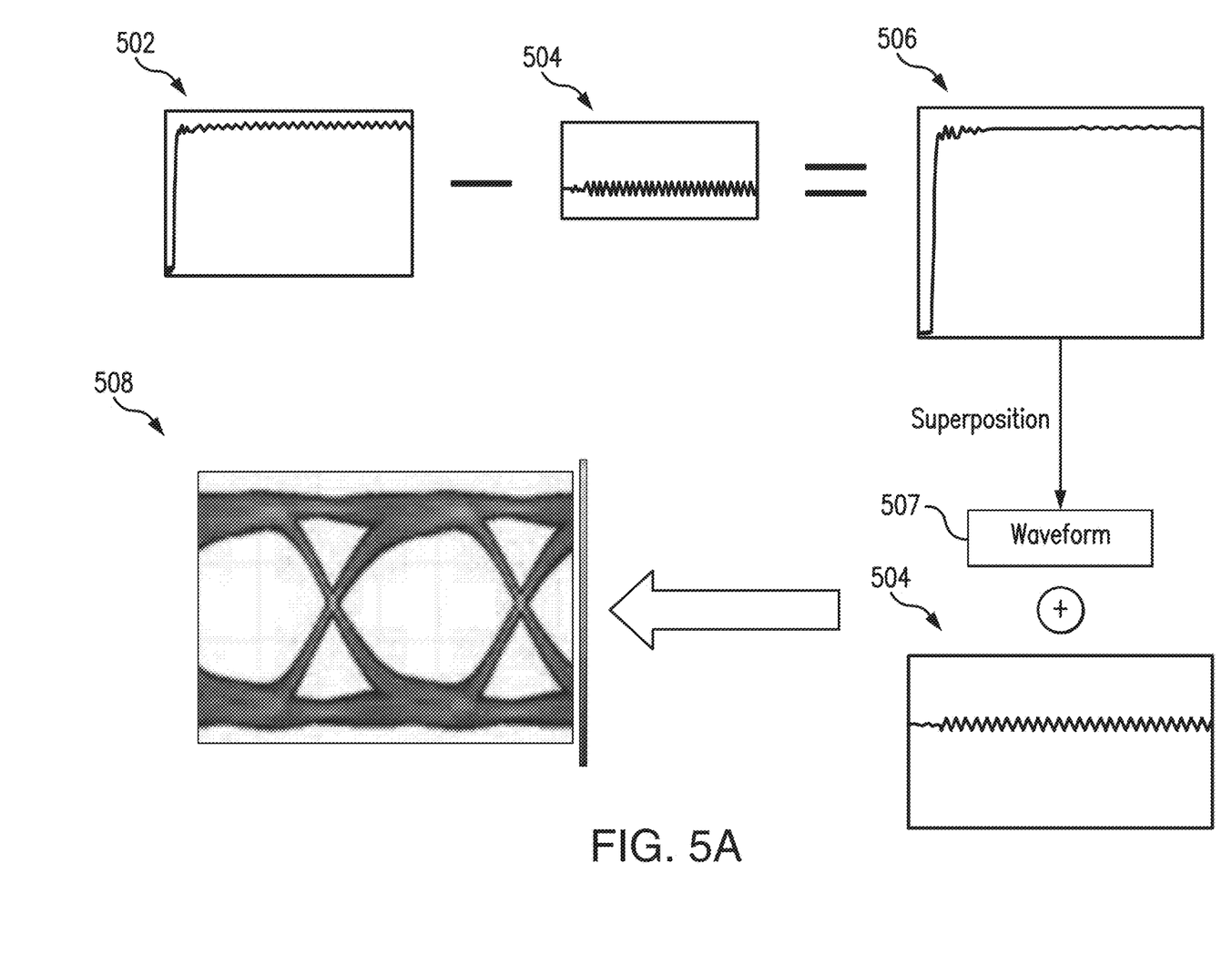
FIG. 5A illustrates generation of an eye diagram using noiseless edge response superposition.

FIG. 5A illustrates the generation of an example eye diagram 508 using an edge response superposition. When rise and fall step responses are pre-characterized, these responses are repeatedly added to the appropriate logic transition points based on given input bit symbols to compute overall bit sequence response of the channel in the time domain. In the example of FIG. 5A, a rising edge response 502 that includes noise may be denoised by subtracting a characterized steady state noise 504 from the rising edge response 502. For example, the steady state noise present in the rising edge response 502 may be characterized by running a short transient analysis (e.g., without channel excitation). The characterized noise may then be removed or subtracted from the rising edge response 502 to produce the clean rising edge response 506.

Superposition may be performed using the clean rising edge response 506 (e.g., and a similarly obtained clean falling edge response) to generate a waveform 507 for eye diagram generation. The superposition process may be the same as the one described in FIG. 3 for in(t) and k1(t), which may continuously add edge responses with time shift. Because the edge responses $p'_{main}(t)$ and $p'_{xtalk1}(t)$ do not contain a steady state noise, the resulting waveforms are noiseless.

The steady state noise 504 is then added to that waveform 507 to produce a more accurate eye diagram 508. For example, a convolution operation may be performed to add the characterized steady state noise 504 to the waveform 507. During the noise addition, it may be assumed that the pre-characterized noise waveform is repetitive. Noise level estimation may be performed using a similar technique as the noise removal process. During the logic low state noise characterization, it may be assumed that the noise level is consistent for the entire bias voltage (e.g., consistent for between logic low and logic high levels). And when both low and high levels noises are characterized, a weighted average may be used. After the characterized steady state noise 504 is added to the waveform 507, the eye diagram 508 is generated. Because the noise is removed from the edge response 502 before superposition and then added to the waveform 507 after superposition, the eye diagram 508 accurately captures the effects of the noise (e.g., the effects of the noise is counted once) and does not overcount the effects of the noise.

Figure 5B:
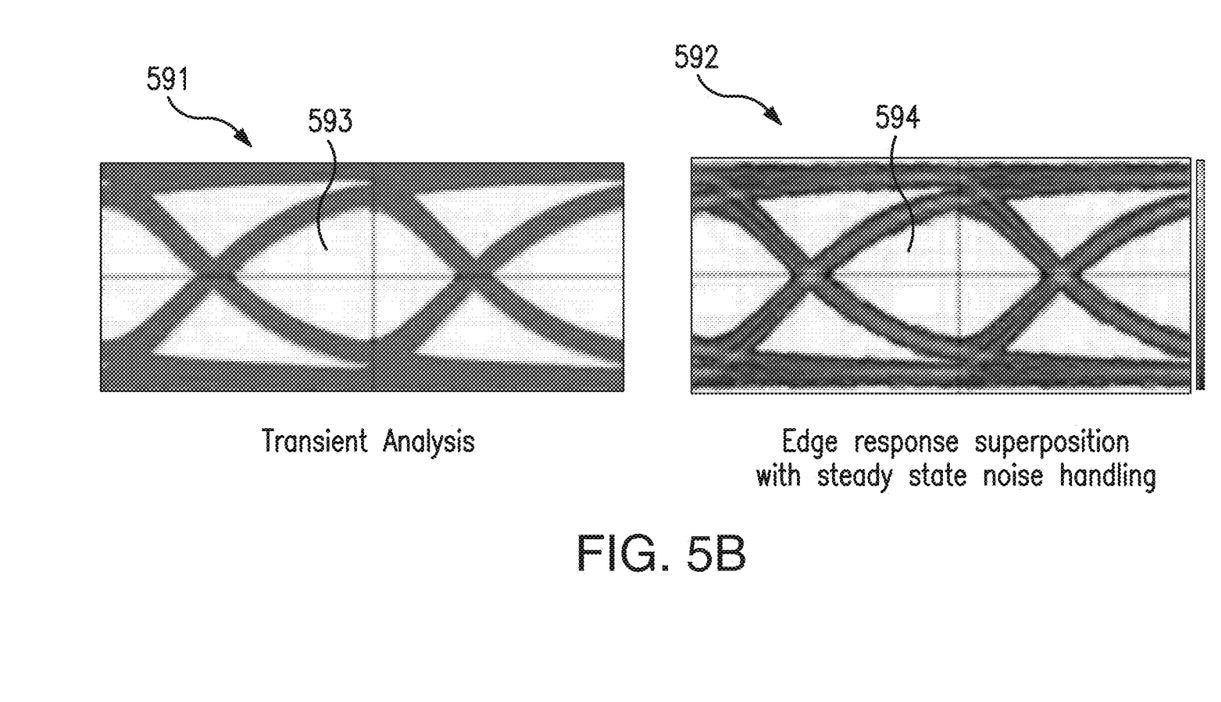
FIG. 5B illustrates an eye diagram generated using a transient analysis and an eye diagram generated using edge response superposition with steady state noise handing.

FIG. 5B illustrates an eye diagram 591 generated using a transient analysis and an eye diagram 592 generated using edge response superposition with steady state noise handling as described herein. As shown, the eye diagram 592 provides a level of accuracy that is similar to using a transient analysis, but may be generated faster because a superposition technique is implemented. Specifically, the eye diagram 591 includes an eye opening 593 and the eye diagram 592 includes an eye opening 594. The eye opening 593 is similar in size to the eye opening 594, which indicates that the superposition technique provides a similar level of accuracy to transient analysis.

Figure 6:
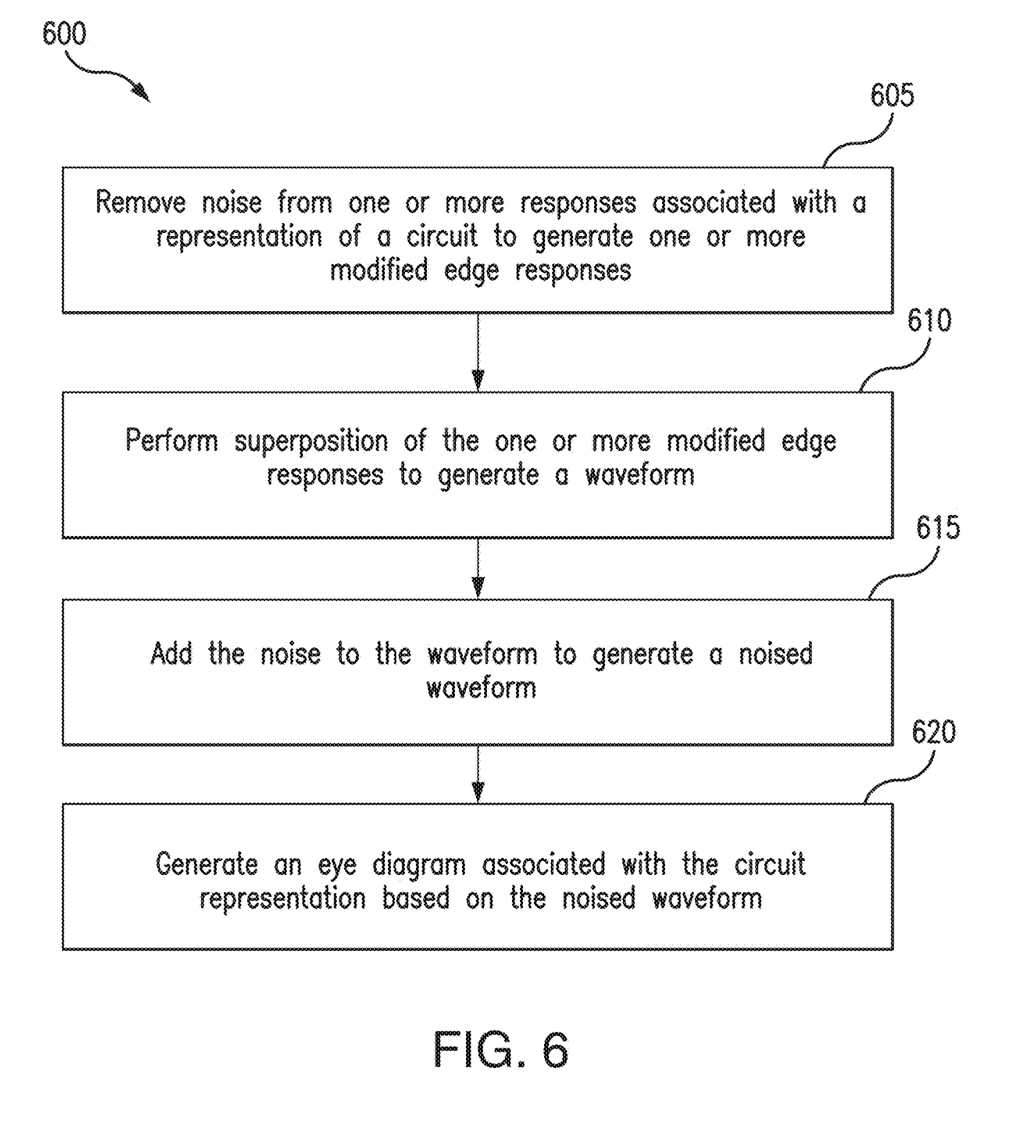
FIG. 6 is a flow diagram illustrating example operations for circuit analysis in accordance with certain aspects of the present disclosure.

FIG. 6 is a flow diagram illustrating an example operation 600 for circuit analysis in accordance with certain aspects of the present disclosure. In some embodiments, a computer system (such as the computer system 800 of FIG. 8) or a processing device (such as the processing device 802 of FIG. 8) performs the operation 600. By performing the operation 600, a superposition technique may be performed without overcounting the effects of steady state noise.

The operation 600 begins at 605. The computer system removes noise (e.g., steady-state noise) from one or more edge responses (e.g., rising and falling edge responses) of a representation of a circuit to generate one or more modified edge responses. In some aspects, the noise is independent of data input to the circuit. The steady state noise may be caused by a non-ideal power supply to the circuit. For example, the noise may be caused by ripples in the power output of the power supply. The computer system may first characterize the noise in the one or more edge responses (e.g., by performing a transient analysis). The computer system then removes or subtracts the noise from the one or more edge responses.

In some aspects, the noise is determined with a logic low representation of signals in the circuit. In other aspects, the noise is determined with logic low representation of signals in the circuit and with logic high representation of the signals in the circuit. For example, the noise may be determined as a weighted average of a first noise associated with the logic low representation of the signals and a second noise associated with a logic high representation of the signals.

At 610, the computer system performs superposition of the one or more modified edge responses to generate a waveform. During superposition, the computer system may add the one or more modified edge responses to produce the waveform. Because the steady state noise has been removed from the one or more modified edge responses, the superposition operation does not count or take into account the effects of the noise.

At 615, the computer system adds the steady state noise to the waveform to generate a noised waveform. For example, the computer system may perform a convolution operation to add the characterized steady state noise to the waveform. As a result, the noised waveform includes the effects of the noise, but the effects of the noise have not been overcounted during the superposition operation.

At 620, the computer system generates an eye diagram for the representation of the circuit based on the noised waveform. Because the effects of the noise were not overcounted during the superposition operation and because the characterized noise was added to the waveform after the superposition operation, the effects of the noise are only counted once when generating the eye diagram. As a result, the eye diagram accurately captures the effects of the noise and more accurately characterizes the circuit response (e.g., the response of a channel in the circuit). Specifically, the eye diagram is not overly pessimistic, in some embodiments.

Figure 7:
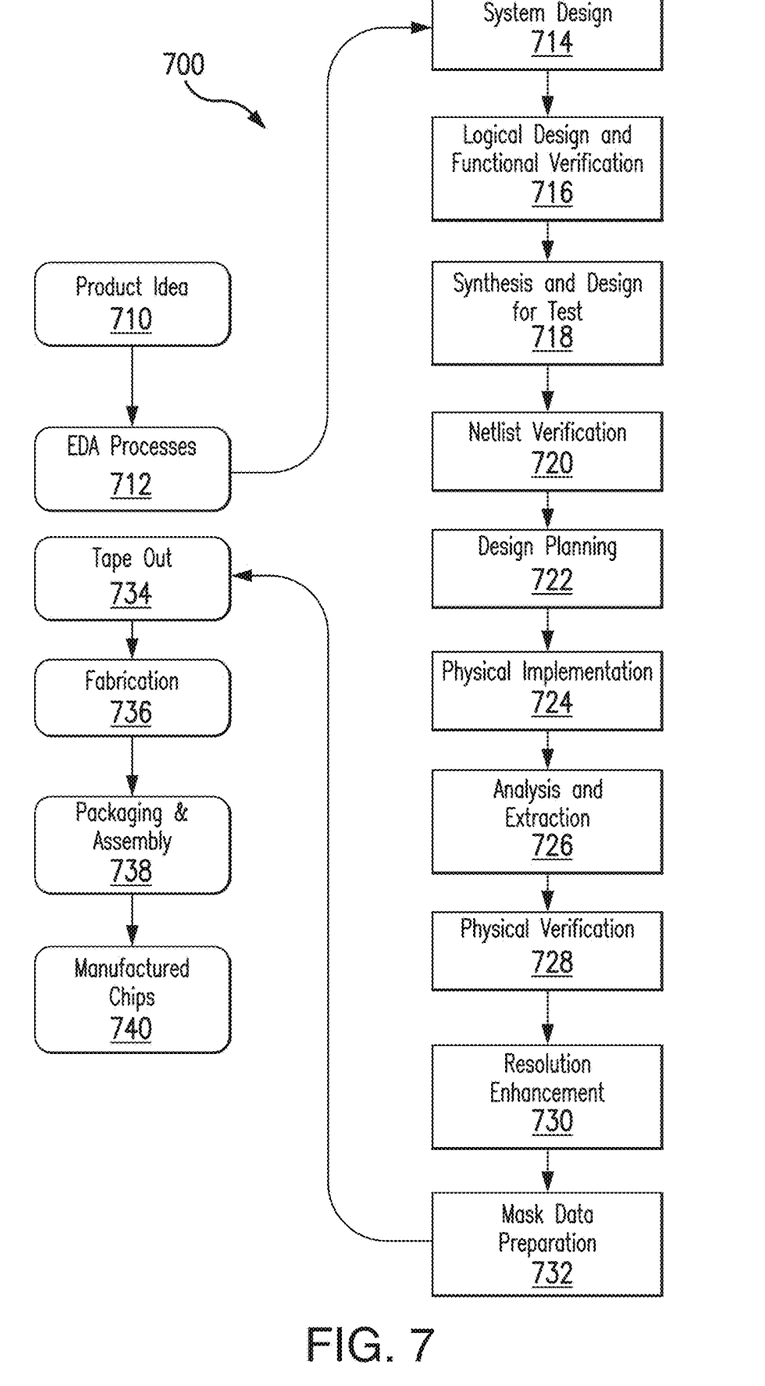
FIG. 7 illustrates an example set of processes used during the design, verification, and fabrication of an article of manufacture.

FIG. 7 illustrates an example set of processes 700 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 710 with information supplied by a designer, information which is transformed to create an article of manufacture that uses a set of EDA processes 712. When the design is finalized, the design is taped-out 734, which is when artwork (e.g., geometric patterns) for the integrated circuit is sent to a fabrication facility to manufacture the mask set, which is then used to manufacture the integrated circuit. After tape-out, a semiconductor die is fabricated 736 and packaging and assembly processes 738 are performed to produce the finished integrated circuit 740.

Specifications for a circuit or electronic structure may range from low-level transistor material layouts to high-level description languages. A high-level of representation may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower representation level that is a more detailed description adds more useful detail into the design description, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding tools of that layer (e.g., a formal verification tool). A design process may use a sequence depicted in FIG. 7. The processes described by be enabled by EDA products (or tools).

During system design 714, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 716, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 718, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 720, the netlist is checked for compliance with timing constraints and for correspondence with the HDL code. During design planning 722, an overall floor plan for the integrated circuit is constructed and analyzed for timing and top-level routing.

During layout or physical implementation 724, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 726, the circuit function is verified at the layout level, which permits refinement of the layout design. During physical verification 728, the layout design is checked to ensure that manufacturing constraints are correct, such as DRC constraints, electrical constraints, lithographic constraints, and that circuitry function matches the HDL design specification. During resolution enhancement 730, the geometry of the layout is transformed to improve how the circuit design is manufactured.

During tape-out, data is created to be used (after lithographic enhancements are applied if appropriate) for production of lithography masks. During mask data preparation 732, the 'tape-out' data is used to produce lithography masks that are used to produce finished integrated circuits.

A storage subsystem of a computer system (such as computer system 800 of FIG. 8) may be used to store the programs and data structures that are used by some or all of the EDA products described herein, and products used for development of cells for the library and for physical and logical design that use the library.

Figure 8:
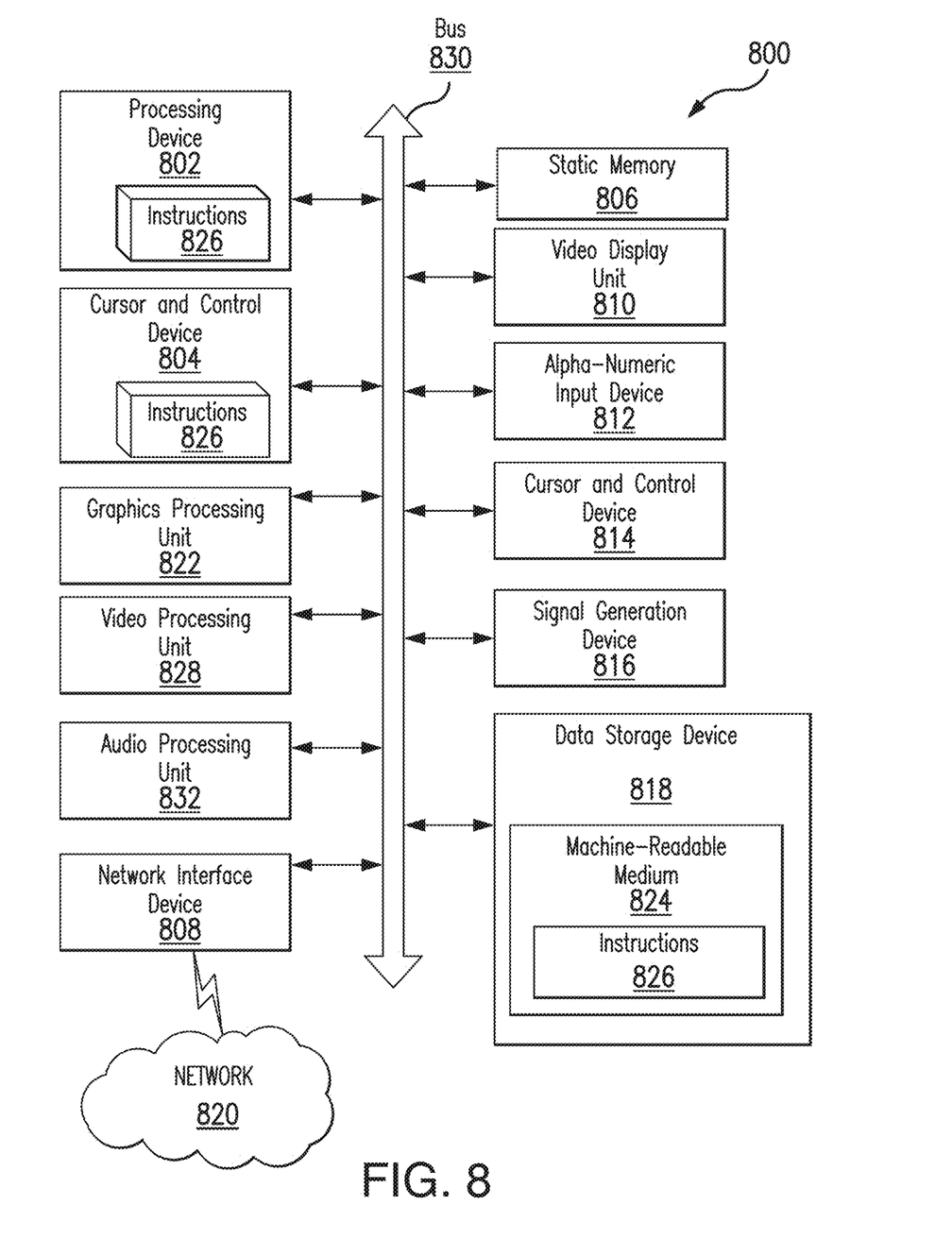
FIG. 8 illustrates an example machine of a computer system.

FIG. 8 illustrates an example machine of a computer system 800 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM), a static memory 806 (e.g., flash memory, static random access memory (SRAM), etc.), and a data storage device 818, which communicate with each other via a bus 830.

Processing device 802 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 may be configured to execute instructions 826 for performing the operations and steps described herein.

The computer system 800 may further include a network interface device 808 to communicate over the network 820. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), a graphics processing unit 822, a signal generation device 816 (e.g., a speaker), graphics processing unit 822, video processing unit 828, and audio processing unit 832.

The data storage device 818 may include a machine-readable storage medium 824 (also known as a non-transitory computer-readable medium) on which is stored one or more sets of instructions 826 or software embodying any one or more of the methodologies or functions described herein. The instructions 826 may also reside, completely or at least partially, within the main memory 804 and/or within the processing device 802 during execution thereof by the computer system 800, the main memory 804 and the processing device 802 also constituting machine-readable storage media.

In some implementations, the instructions 826 include instructions to implement functionality corresponding to the present disclosure. While the machine-readable storage medium 824 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 802 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method for circuit analysis, comprising:
   removing noise from an edge response of a circuit to produce a modified edge response;
   performing superposition of the modified edge response to generate a waveform;
   adding the removed noise to the waveform to generate a noised waveform; and
   generating, based on the noised waveform, an eye diagram for the circuit.

2. The method of claim 1, wherein the noise comprises steady-state noise.

3. The method of claim 1, wherein the noise is independent of data input for the circuit.

4. The method of claim 1, wherein the noise is determined with a logic low representation of signals of the circuit.

5. The method of claim 1, wherein the noise is determined based on a first noise waveform determined using a logic low representation of signals of the circuit and a second noise waveform determined using a logic high representation of the signals of the circuit.

6. The method of claim 5, wherein the noise is determined based on a weighted average of the first noise waveform and the second noise waveform.

7. The method of claim 1, wherein the noise comprises noise induced by a power supply for the circuit.

8. The method of claim 1, wherein the noise comprises noise induced by crosstalk between communication channels in the circuit.

9. The method of claim 1, further comprising verifying an operation of the circuit based on the eye diagram.

10. A system for circuit analysis, comprising:
    a memory; and
    a processor communicatively coupled to the memory, the processor configured to:
      remove noise from an edge response of a circuit to produce a modified edge response;
      perform superposition of the modified edge response to generate a waveform;
      add the removed noise to the waveform to generate a noised waveform; and
      generate, based on the noised waveform, an eye diagram for the circuit.

11. The system of claim 10, wherein the noise comprises steady-state noise.

12. The system of claim 10, wherein the noise is independent of data input for the circuit.

13. The system of claim 10, wherein the noise is determined with a logic low representation of signals of the circuit.

14. The system of claim 10, wherein the noise is determined based on a first noise waveform determined using a logic low representation of signals of the circuit and a second noise waveform determined using a logic high representation of the signals of the circuit.

15. The system of claim 14, wherein the noise is determined based on a weighted average of the first noise waveform and the second noise waveform.

16. The system of claim 10, wherein the noise comprises noise induced by a power supply for the circuit.

17. The system of claim 10, wherein the noise comprises noise induced by crosstalk between communication channels in the circuit.

18. The system of claim 10, wherein the processor is further configured to verify an operation of the circuit based on the eye diagram.

19. A non-transitory computer readable medium storing instructions that, when executed by a processor, cause the processor to:
- characterize a steady-state noise in a circuit induced by a power supply for the circuit;
- remove the steady-state noise from an edge response of the circuit to produce a modified edge response;
- generate a waveform by performing superposition of the modified edge response;
- add the steady-state noise to the waveform to generate a noised waveform;
- generate, based on the noised waveform, an eye diagram for the circuit; and
- verify an operation of the circuit based on the eye diagram.

20. The medium of claim 19, wherein adding the steady-state noise to the waveform comprises convoluting the steady-state noise with the waveform.

* * * * *